United States Patent [19]
Keane

[11] Patent Number: 5,862,595
[45] Date of Patent: Jan. 26, 1999

[54] COMBINED TRIMMER AND VACUUM APPARATUS

[76] Inventor: Stephen Timothy Keane, 36 Castlewood Park, Ennis, Ireland

[21] Appl. No.: 744,996

[22] Filed: Nov. 7, 1996

[51] Int. Cl.$^6$ .................................................. A01D 34/70
[52] U.S. Cl. ................................. 30/124; 30/276; 56/13.3
[58] Field of Search ...................... 30/124, 276; 56/12.7, 56/13.1, 13.3, 13.4

[56]  References Cited

U.S. PATENT DOCUMENTS

| | | | |
|---|---|---|---|
| 1,990,991 | 2/1935 | Haubach | 30/124 X |
| 3,103,069 | 9/1963 | Gary | 30/124 |
| 3,214,869 | 11/1965 | Stryker | 30/124 X |
| 4,335,567 | 6/1982 | Comer | 56/12.7 |
| 4,361,000 | 11/1982 | Friberg | 56/12.7 X |
| 4,543,718 | 10/1985 | Duescher | 30/124 |
| 4,715,123 | 12/1987 | John et al. | 30/276 |
| 4,964,472 | 10/1990 | Cleworth | 56/239 X |
| 5,588,289 | 12/1996 | Wilson | 30/124 X |

FOREIGN PATENT DOCUMENTS 2246939  2/1992  United Kingdom .................... 56/12.7

Primary Examiner—Eugenia A. Jones

[57]  ABSTRACT

A hand-holdable trimmer for garden and lawn applications has an elongated housing defining an air passage extending from the trimmer's rotating trimmer head to a collection container for cuttings mounted distally on the housing. An impeller wheel driven by the trimmer motor causes air to flow under positive pressure from the region surrounding the trimmer head through the housing air passage to eventually deliver the trimmer cuttings to the collection container. A dual, axially adjustable trimmer head assembly also is provided to more efficiently cut grass, weeds, etc. into small pieces capable of being easily transferred to the collection container.

4 Claims, 4 Drawing Sheets

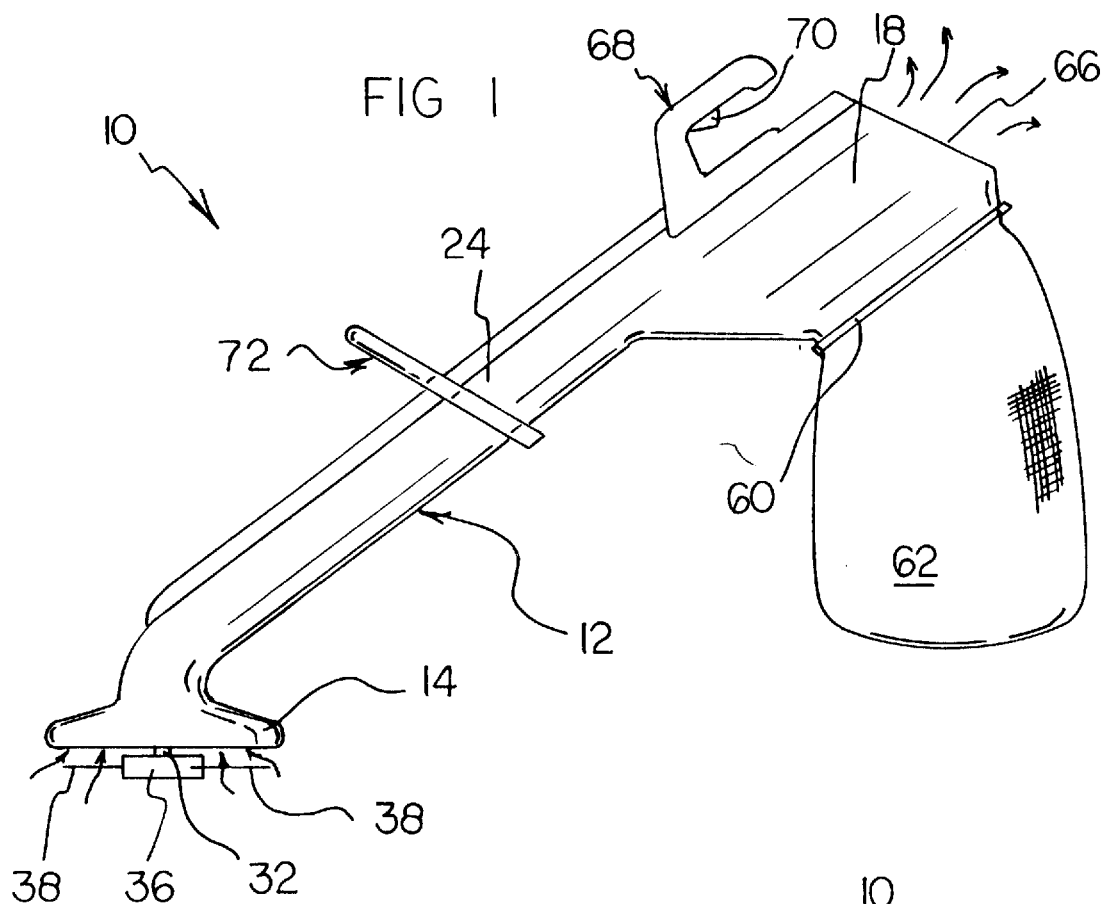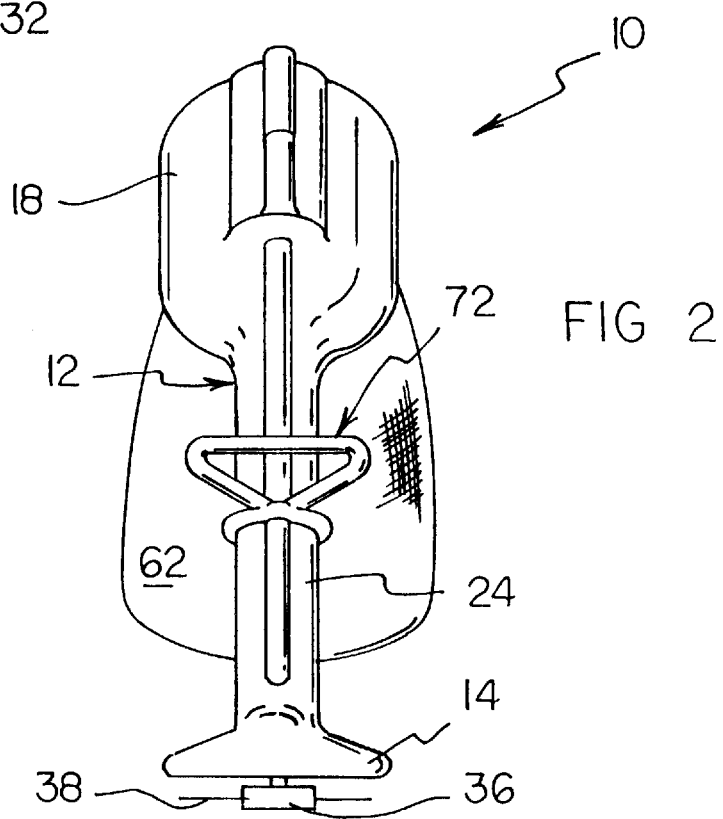

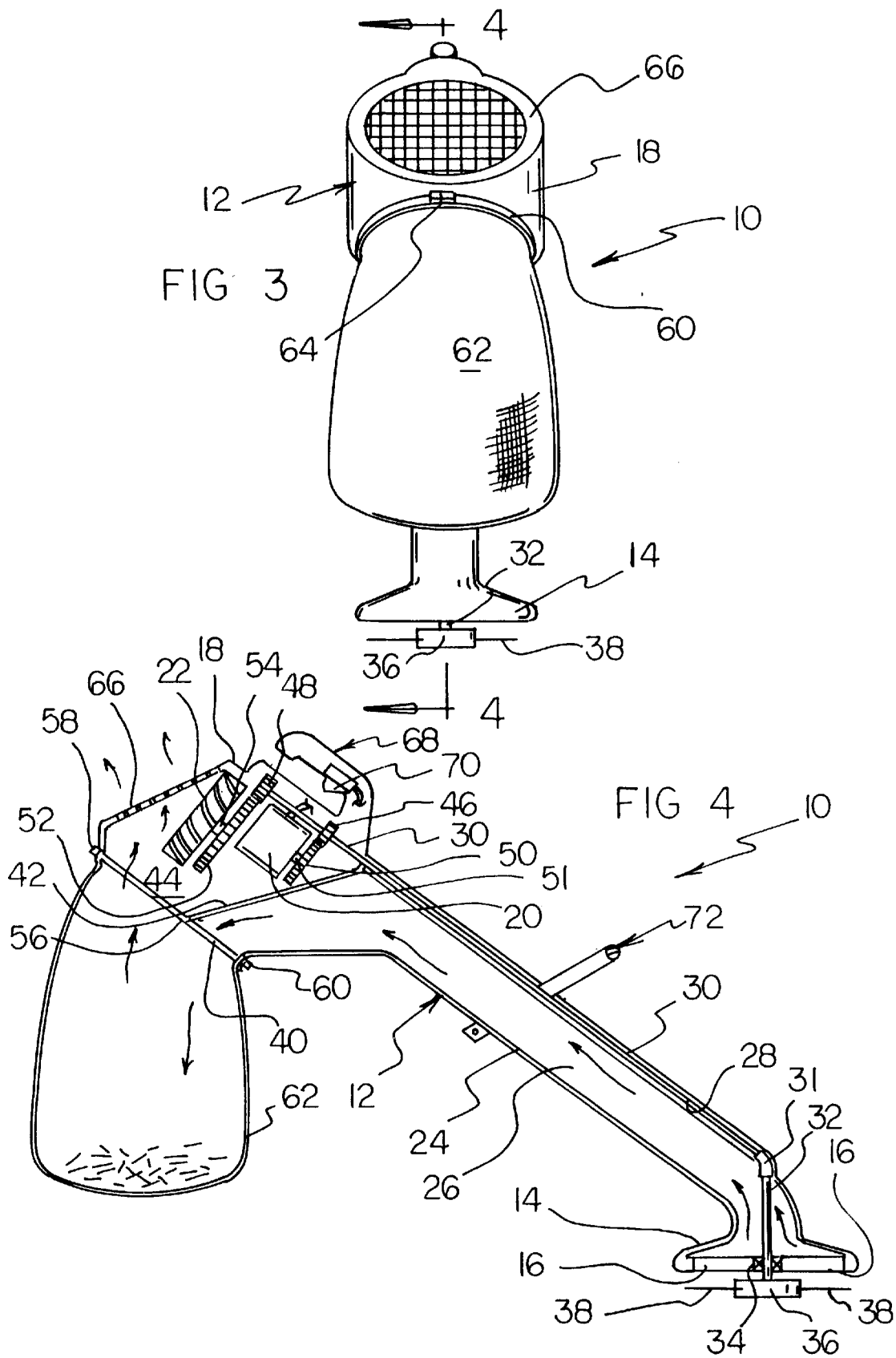

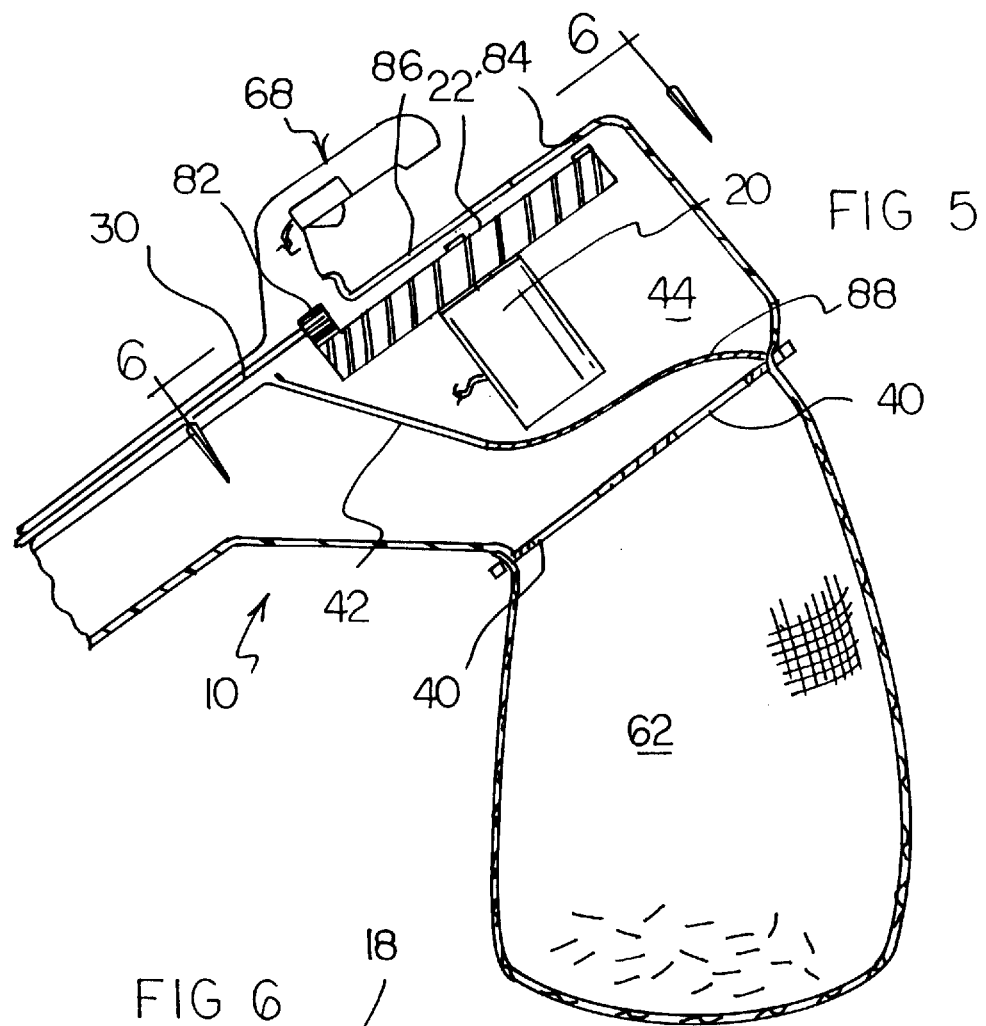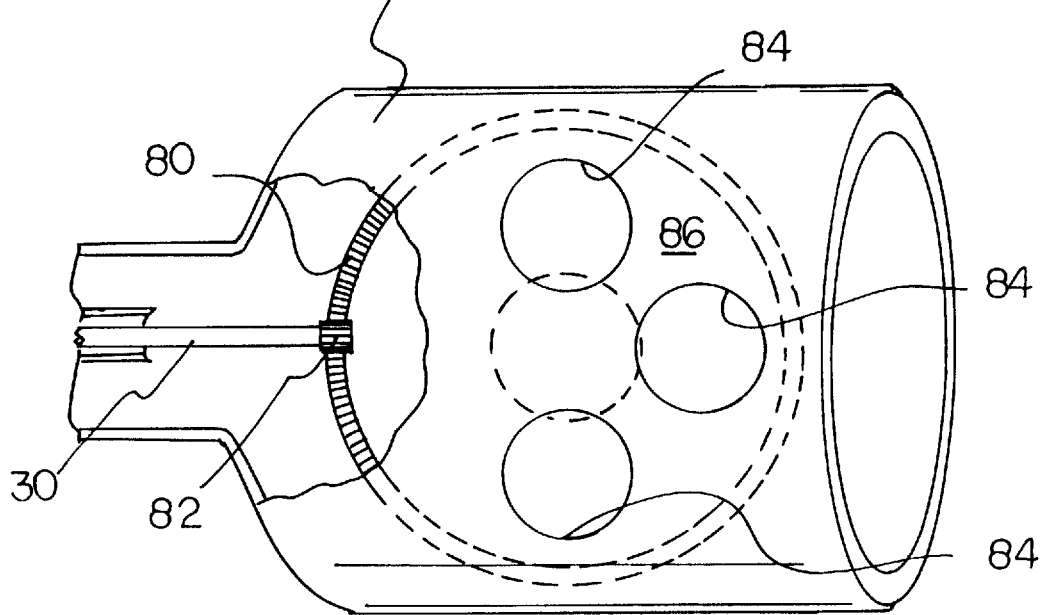

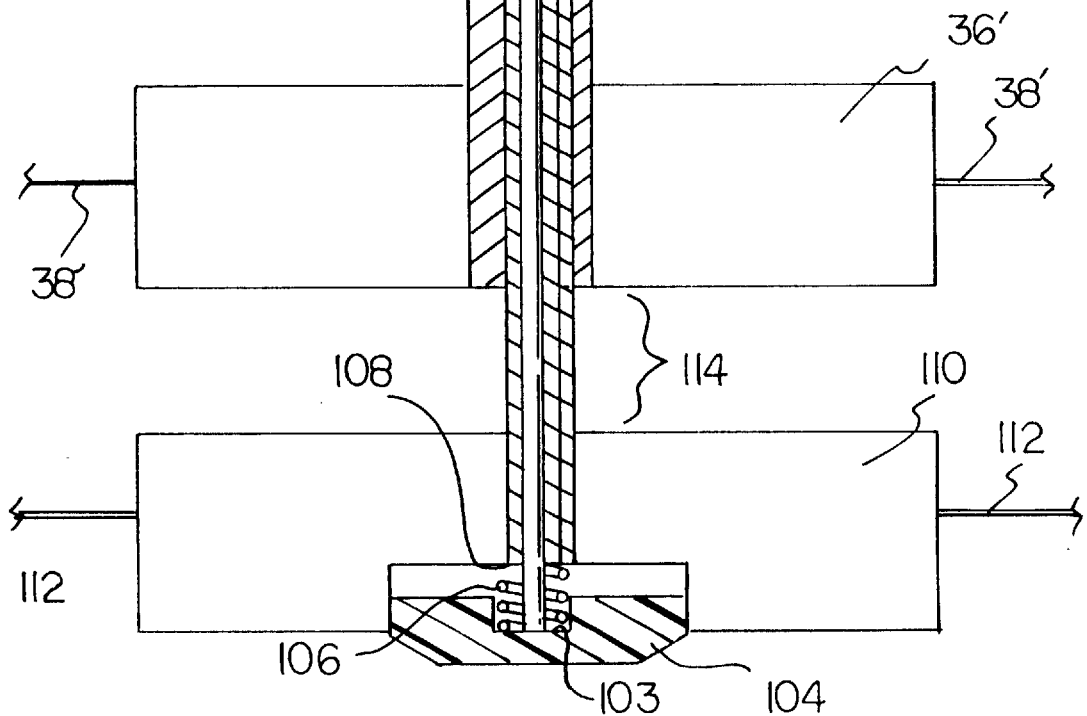

COMBINED TRIMMER AND VACUUM APPARATUS

BACKGROUND OF THE INVENTION

1. Field of the Invention

The present invention relates generally to portable, hand-holdable trimmer devices for lawn and garden use, and, more particularly, to hand-holdable trimmer apparatus incorporating therein a vacuum system for collecting the trimmer cuttings into a convenient collection container mounted on the apparatus.

2. Description of the Prior Art

Portable hand-holdable grass or weed trimmers are known which generally comprise an elongated support, a drive motor mounted on one end of the support and a rotating cutting head with flexible filaments or the like mounted on the opposite end of the shaft with the cutting head being driven by the drive motor through a coupling shaft extending along or inside the support. An example of such known grass or weed trimmer is illustrated in U.S. Pat. No. 4,704,849.

When using such grass or weed trimmers the cuttings are usually dispersed over a relatively wide area because of the high rotation speed of the filament head. This necessitates a laborious effort to gather or otherwise dispose of the dispersed cuttings using a separate sweeper, vacuum or blower apparatus. It would be extremely advantageous if a grass or weed trimmer incorporated means for sucking up the grass cuttings immediately after they are produced by the cutting head and for storing the cuttings in a container carried with the trimmer thereby eliminating the extra step of gathering dispersed cuttings. Such an improved apparatus is provided by the present invention.

SUMMARY OF THE INVENTION

To achieve the foregoing and other advantages, the present invention, briefly described, provides a hand-holdable trimmer for garden and lawn applications having an elongated housing defining an air passage extending from the trimmer's rotating trimmer head to a collection container for cuttings mounted distally on the housing. An impeller wheel driven by the trimmer motor inside the housing causes air to flow under positive pressure from the region surrounding the trimmer head through the housing air passage to eventually deliver the trimmer cuttings to the collection container. A dual, axially adjustable trimmer head assembly also is provided to more efficiently cut grass, weeds, etc. into small pieces capable of being easily transferred to the collection container.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved combined trimmer and vacuum apparatus which has all of the advantages of the prior art and none of the disadvantages.

It is another object of the present invention to provide a new and improved combined trimmer and vacuum apparatus which may be easily and efficiently manufactured and marketed.

It is a further object of the present invention to provide a new and improved combined trimmer and vacuum apparatus which is of durable and reliable construction.

An even further object of the present invention is to provide a new and improved combined trimmer and vacuum apparatus which combines the dual functions of trimming and substantially simultaneously collecting the trimmer cuttings and transferring them to a collection container associated with the apparatus.

It is yet a further object of the present invention to provide a new and improved combined trimmer and vacuum apparatus incorporating a drive motor which drives both the trimmer head thereof and an impeller wheel mounted inside the motor housing whereupon the impeller causes a vacuum in an air passage extending between the trimmer head assembly and a collection container assembly.

It is another object of the present invention to provide a new and improved combined trimmer and vacuum apparatus having dual trimmer heads, the axial spacing of which may be manually adjusted.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a first embodiment of the trimmer apparatus of the invention.

FIG. 2 is a front view of the embodiment of FIG. 1.

FIG. 3 is a rear view of the embodiment of FIG. 1.

FIG. 4 is a cross-sectional elevational view of the embodiment of FIG. 1.

FIG. 5 is an enlarged cross-sectional elevational view of a portion of an alternative embodiment of the invention.

FIG. 6 is a partial top view of a the second embodiment of the invention shown in FIG. 5.

FIG. 7 is an elevational view of alternative embodiment of the trimmer head assembly of the invention.

FIG. 8 is an enlarged cross-sectional view taken along line 8—8 of FIG. 7.

DESCRIPTION OF THE PREFERRED EMBODIMENTS

With reference to the drawings, a number of embodiments of a new and improved combined trimmer and vacuum apparatus embodying the principles and concepts of the present invention will be described.

Turning to FIGS. 1–4, there is shown a first embodiment of the combined trimmer and vacuum apparatus of the invention generally designated by reference numeral 10. In its first preferred form, apparatus 10 includes an elongate housing 12 having an enlarged first end 14 defining a mouth with an opening 16 for the passage of grass cuttings (FIG. 4). At the opposite end of elongate housing 12 there is an enlarged second end 18 to provide interior space for a drive motor 20 and impeller wheel 22 among other parts as will be explained in more detail below.

Disposed between first end 14 and second end 18 is an intermediate portion 24 of elongate housing 12 which defines an interior air passage 26 and a separate tubular space 28 enclosing and supporting a drive shaft 30 with the tubular space, the drive shaft and the air passage extending parallel to each other and to the central longitudinal axis (not shown) of the elongate housing substantially as depicted in FIG. 4. At the distal end of shaft 30, a flexible coupling 31 is provided connected to a drive shaft extension 32, the axis of which extends at an angle to main drive shaft 30. Extension 32 extends through bearing 34 suitably supported within opening 16 by a bracket plate (not shown) or the like and carries at its distal extremity rotatable filament head 36 having multiple radially extending flexible filaments 38 each of which parts are well known in the art. It will be appreciated that the plane of the radial filaments 38 lies below the plane of the opening 16 in proximity thereto.

Passage 26 extends rearwardly toward second end 18 and terminates in an opening 40. In enlarged second end 18, a transverse wall 42 separates passage 26 from interior compartment 44 in which is located drive motor 20 and impeller wheel 22. Shaft 30 extends rearwardly through a suitable opening into compartment 44 and has affixed thereto in spaced axial relation a first drive gear 46 and a second drive gear 48. Matingly coupled to first drive gear 46 is the output gear 50 affixed to the output shaft 51 of motor 20. Second drive gear 48 is matingly coupled to reducing gear 52 which in turn drives impeller wheel 22 about an axis defined by a drive shaft 54 extending between reducing gear 52 and impeller wheel 22 substantially as shown.

Located adjacent opening 40 is an opening 56 communicating with the interior compartment 44 with opening 56 and opening 40 preferably lying in a common plane defined by annular rim 58 which latter, in turn, serves as a support for the attachment ring 60 of a grass or weed cuttings collection bag 62 or similar container so that when the ring is securely fitted to rim 58 by means of a conventional finger-operated latch 64, the details of which form no part of the present invention, the bag 62 hangs generally downwardly as substantially illustrated in FIGS. 1–4. The rear facing end surface 66 includes a series of perforations so that air in compartment 44 may be exhausted therefrom as indicated in FIGS. 1 and 4 under the influence of rotating impeller wheel 22. A screen (not shown) may be placed over opening 56 to prevent cuttings from escaping through the perforations in the end surface 66.

A handle assembly 68 is affixed to the enlarged end portion 18 and extending upwardly therefrom includes the usual control button 70 for controlling "on-off" and "speed" functions of drive motor 20. A grab-handle assembly 72 is suitable affixed to intermediate portion 24 and extends upwardly and at an angle to the central longitudinal axis of apparatus 10 as viewed in FIGS. 1 and 4. By holding handle assembly 68 in one hand and grab-handle assembly 72 in the other hand, the first end of apparatus 10 may easily be guided to those areas where it is desired to trim grass, weeds, etc., all of the while retaining control over the operation of motor 20, etc., via control button 70.

In operation, actuation of control button 70 causes motor 20 to rotate drive shaft 30 through first gear 46. This action, in turn, causes extension shaft 32 to rotate about its axis thereby causing the filament head 36 and flexible filaments 38 to rotate about the axis defined by shaft extension 32. Simultaneously, second gear 48 is rotated causing rotation of reducer gear 52 and impeller wheel 22 about the axis of axle 54. The impeller wheel 22 is of the well-known variety which when rotated is adapted to cause air in compartment 44 to flow out through the perforations in end surface 66 which, in turn creates a region of low air pressure or "vacuum" in the interior of bag 62 and air passage 26. The resulting low pressure causes a vigorous flow of air through opening 16 in enlarged first end 14 thereby sucking up the cuttings being created substantially simultaneously by the action of the rotating filaments 38. The cuttings are carried by the flowing airstream through opening 16, air passage 26, and opening 40, as shown by the arrows in FIG. 4, and ultimately deposited within the interior of bag 62 as schematically indicated.

Motor 20 preferably is powered by a source of electrical energy obtained from a rechargeable battery pak (not shown) stored inside compartment 44, or by an electrical extension cord extending from the housing end 18 and connected to an outdoor electrical power receptacle. Alternatively, motor 20 may be a gasoline powered engine as are sometimes used in the art of potable grass or weed trimmers.

Turning to FIGS. 5 and 6, there is shown an alternatively preferred embodiment of the invention wherein motor 20 has its output shaft axis of rotation orthogonally related to the drive shaft 30 and motor 20 is directly coupled to a combination impeller wheel and flywheel 22'. In such alternative arrangement, the impeller wheel has a ring gear 80 peripherally located on its upper surface and the ring gear is matingly engaged with a pinion gear 82 affixed to the end of drive shaft 30. Additionally, a series of three large air vents 84 are located in the top wall 86 of enlarged end 18 substantially as shown. A screen portion 88 in transverse wall 42 prevents grass clippings from entering compartment 44.

In FIGS. 7 and 8, there is shown an alternatively preferred "dual" trimmer head assembly which may be employed in lieu of the single head assembly described above. In the alternative arrangement of FIGS. 7 and 8, drive shaft extension 32' is hollow to define an interior space 90 and includes an axially slidable rod 92 therein which is prevented from relative rotation therein by a longitudinal key 94 integral with rod 92 and slidably engaged within a complimentary keyway (not labeled) located in the inside surface defined by interior space 90. The slidable rod 92 is maintained in a selected axial position relative to shaft extension 32' by means of a pivotal pawl 96 mounted on the top end of another slidable rod 97 coaxially extending through a central bore 99 provided in rod 92. Pawl 96 is pivotally attached to the end of inner rod 97 by an orthogonal hinge pin 98 and a spring 100 tending to bias the pawl downwardly toward the top end 101 of rod 92. In the position shown in FIG. 8, pawl 96 engages ratchet 102 provided on inside surface of interior space 90 substantially as shown. Also maintaining slidable rod 92 in the normal position shown in FIG. 8, is a coil spring 106 engaged between end surface 103 of depressible button, 104 and the end surface 108 of rod 92. Suitably affixed to the bottom extremity of rod 92 is a second filament head 110 and a second series of flexible filaments 112.

In operation, the "dual" filament head assembly of FIGS. 7 and 8 is effective in cutting grass, weeds, etc, into smaller pieces than is otherwise possible with a single head assembly, and thus improves the efficiency of "pick up" of these cuttings by the airstream flowing through opening 16. Moreover, the axial spacing 114 between the dual filament heads is variable by simply depressing the button 104 upwardly as viewed in FIG. 8, whereupon rod 97 slides upwardly relative to rod 92 permitting the spring 100 to rotate the pawl downwardly (FIG. 8) thereby freeing the pawl from ratchet and permitting the second filament head 110 to be slidably displaced to a new relative axial position within space 90. Release of the button 104 causes the end surface 101 of rod 92 to urge the pawl 96 upwardly and back into engagement with ratchet 102 thus locking the heads 36' and 110 into their new relative position. By varying the spacing of the filament heads in accordance with the present invention, as described above, the size of cuttings may be varied and or controlled in a corresponding manner.

The components of the combined trimmer and vacuum apparatus of the invention can be made from inexpensive and durable metal, plastic and other suitable known materials.

As to the manner of usage and operation of the instant invention, the same is apparent from the above disclosure, and accordingly, no further discussion relative to the manner of usage and operation need be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Accordingly, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the foregoing Abstract provided at the beginning of this specification is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by LETTERS PATENT of the United States is as follows:

1. A combined trimmer and vacuum apparatus for use in a garden, said apparatus comprising:

an elongate housing;

said housing having a first end and an opposed second end, said first end defining a first housing end opening, said housing having a passage extending between said first housing end opening and said housing opposed second end, a drive motor mounted on said housing in communication with said passage, an impeller mounted on said housing, means coupling said drive motor to said impeller to cause rotation of said impeller, a rotating trimmer head assembly mounted for rotation in said first end opening, and a drive shaft between said drive motor and said trimmer head assembly wherein said rotation of said impeller causes air to flow through said passage from said first end opening simultaneously upon rotation of said trimmer head assembly;

wherein said housing opposed second end includes first, second and third openings, wherein said housing has a container mounted thereon in communication with said second housing opposed end first and second openings, wherein said passage communicates with said container through said second housing opposed end first opening;

wherein said second housing opposed end further includes a hollow portion defining an interior compartment, said impeller is mounted for rotation in said interior compartment and said second housing opposed end second and third openings communicate respectively with said interior compartment, and wherein said second housing opposed end second opening is disposed between said interior compartment and said container such that air flowing through said passage enters said container through said second housing end first opening, passes from said container into said interior compartment through said second housing end second opening and exits said interior compartment through said second housing opposed end third opening.

2. The apparatus of claim 1 wherein said drive shaft between said motor and said head assembly is also coupled to said impeller.

3. The apparatus of claim 1 wherein said impeller is connected to said motor and said drive shaft is connected to said impeller.

4. The apparatus of claim 1 wherein said container is removably mounted on said housing.

* * * * *